United States Patent [19]

Toth et al.

[11] 3,929,877

[45] Dec. 30, 1975

[54] PROCESS FOR THE PRODUCTION OF THIOCARBOHYDRAZIDE

[75] Inventors: Anton Toth, Obernburg; Hans-Dieter Rupp, Kassel-Bettenhausen; Gerhard Meyer, Obernburg, all of Germany

[73] Assignee: Akzo N.V. of Arnhem, Holland, Arnhem, Netherlands

[22] Filed: Nov. 18, 1974

[21] Appl. No.: 524,931

[30] Foreign Application Priority Data
Nov. 26, 1973 Germany............................ 2358819

[52] U.S. Cl. ........................ 260/552 SC; 260/308 R
[51] Int. Cl.² ........................................ C07C 157/02
[58] Field of Search ................... 260/552 SC, 552 R

[56] References Cited
UNITED STATES PATENTS
2,657,234  10/1953  Klarer et al. ................. 260/552 SC
2,726,263  12/1955  Audrieth et al. ............. 260/552 SC OTHER PUBLICATIONS
Audrieth et al., J. Org. Chem., 19, 733 (1954).
Petri, "Preparation of Thiocarbohydrazide," CA 56: 14706i, (1962).
Olin Mathieson Chemical Corp., "Thiocarbohydrazide," CA 51: 8782h, (1957).
Guha et al., "Preparation of Thiocarbohydrazide...," CA 18: 2687[5] (1924).
Stolle et al., Ber Deut. Chem. 41, 1099 (1908).
Beilstein's Organische Chemie, 3 II 137, 3 III 319, (1943).

Primary Examiner—R. V. Hines
Assistant Examiner—Thomas A. Waltz
Attorney, Agent, or Firm—Johnston, Keil, Thompson & Shurtleff

[57] ABSTRACT

Process for producing thiocarbohydrazide in high yields above 75%, especially above 90%, by heating hydrazine-dithiocarbazinate at about 20°–85°C. in an aqueous or a water-free hydrazine hydrate containing hydrogen sulfide, for example in an amount of at least about 1% and preferably about 2 to 36% by weight $H_2S$. The heating or thermal treatment is carried out at about 20°C. to 85°C., preferably 50°–80°C. and especially 72°–78°C. Almost quantitative yields can be achieved in producing the thiocarbohydrazide which is of known utility, especially in producing biocides for the agricultural industry.

8 Claims, No Drawings

PROCESS FOR THE PRODUCTION OF THIOCARBOHYDRAZIDE

Several processes are known for the production of thiocarbohydrazide, see F. Kurzer and M. Wilkinson, Chem. Rev. 70, 111 (1970).

In the hydrazinolysis of thiophosgene, this compound is obtained in moderate yields. As the reaction medium to be used in this process, one may choose ether [Stollé et al., Ber. 41 1099 (1908)] or water [Autenrieth and Hefner, Ber. 58, 2151 (1925)]. It is further known that this compound can be produced by hydrazinolysis of diethylxanthate; see Guha et al., J. Chem. Soc. 125, (1924) 1215. Merely by heating the two reaction components in the absence of a solvent, yields of 70 – 75% of theory are achieved; see Beyer et al., Ber. 87, 1401 (1954). Thiocarbohydrazide may also be produced by reacting dialkyltrithiocarbonates with hydrazine; see Sandström, Arkiv Kemi 4, 297 (1952). Even cyclic trithiocarbonates can be used in this synthesis; for example, ethylene trithiocarbonate produces a yield of 71% of theory of a pure thiocarbohydrazide. The hydrazinolysis of methyl-dithiocarbazinate leads to a yield of 65% of theory of the thiocarbohydrzide; see Audrieth et al., J. Org. Chem. 19, 733 (1954).

The most useful and cheapest synthesis of the thiocarbohydrazide is to be found, however, in the reaction of carbon disulfide with hydrazine. In this case, there is first formed the hydrazinium-dithiocarbazinate according to the reaction equation:

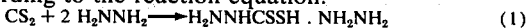

$$CS_2 + 2\ H_2NNH_2 \longrightarrow H_2NNHCSSH \cdot NH_2NH_2 \qquad (1)$$

With repeated concentration by evaporation of a thin aqueous solution, this compound goes over into thiocarbohydrazide with the release of hydrogen sulfide according to the equation:

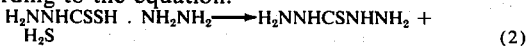

$$H_2NNHCSSH \cdot NH_2NH_2 \longrightarrow H_2NNHCSNHNH_2 + H_2S \qquad (2)$$

Better yields an a purer product are obtained if the hot aqueous solution of the hydrazinium-dithiocarbazinate is digested with lead oxide; see Stollé et al., Ber. 41, 1099 (1908).

The yield of thiocarbohydrazide can be further increased if the decomposition of the hydrazinium-dithiocarbazinate in aqueous solution is carried out in the presence of hydrazine; see Audrieth et al., J. Org. Chemistry 19, 733 (1954), and also U.S. Pat. No. 2,726,263. In this case, it was determined that the yield of the thiocarbohydrazide decreases with an increasing dilution of the reaction medium with water. However, the thiocarbohydrazide yield could not be increased by using a water-free solvent for the hydrazine such as, for example, methanol, ethanol, or propanol. For carrying out this known process, the hydrazinium-dithiocarbonate which may be obtained in the usual manner by reaction of $CS_2$ with hydrazine hydrate is heated in an aqueous hydrazine solution at about 95°C. for a period of 1 to 2 hours under reflux. For each mol of the hydrazinium-dithiocarbazinate, there are used 1 to 3 mols of hydrazine. According to a further embodiment of this known process, carbon disulfide is mixed while cooling in an aqueous solution with a 3- to 6-fold amount of hydrazine and the mixture is then heated. In both of these procedures, the yield may be increased if the thiocarbohydrazide being formed is separated from the reaction mixture sevel times during the course of the reaction. However, even when working in this manner, the yield amounts to only 53.3% of theory.

Finally, it is also known that hydrazinium-dithiocarbazinate obtained in the usual manner can be thermally decomposed into thiocarbohydrazide. In this case, yields of approximately 70% of theory are obtained; see Petri, Z. Naturforsch. 16 B, (1961).

It is an object of the present invention to provide a substantially improved process for producing thiocarbohydrazide with conversions and yields which can be made almost quantitatively and with a substantial reduction or avoidance of undesirable byproducts. Other objects and advantages of the invention will become more apparent from a consideration of the following detailed disclosure.

It has now been found, in accordance with the invention, that a desirable improvement can be achieved in the thermal treatment of hydrazinium-dithiocarbazinate for conversion into thiocarbohydrazide if this treatment is carried out at a temperature of 20°C. to 85°C. in an aqueous or a water-free hydrazine hydrate which contains hydrogen sulfide. Preferred conditions of this improved process are discussed more fully hereinafter.

In the thermal decomposition of hydrazinium-dithiocarbazinate according to equation (2), hydrogen sulfide hydrazinium-dithiocarbazinate arises as a by-product in addition to thiocarbohydrazide so that at least a part of the hydrogen sulfide is dissolved in the hydrazine hydrate reaction medium. Surprisingly, it has been discovered that it is of decisive importance for the hydrogen sulfide to be present at the very beginning of the reaction. It has also been determined that the yields of thiocarbohydrazide obtainable in this reaction are dependent upon the hydrogen sulfide content of the hydrazine hydrate being used as the reaction medium. Furthermore, it has been found that during the decomposition of the hydrazinium-dithiocarbazinate, a side reaction reducing the yield occurs in which 3-hydrazino-4-amino-mercapto-1,2,4-triazole is formed and also that the proportion of this byproduct in the reaction mixture likewise depends upon the content of hydrogen sulfide of the hydrazine hydrate reaction medium, viz. within a certain concentration range, the amount of this byproduct decreases with an increasing content of hydrogen sulfide. This particular result is surprising in the sense that the equation (2) leads one to expect that according to the law of mass action an increase of the hydrogen sulfide concentration would repress the formation of the thiocarbohydrazide.

It is possible to explain the reaction mechanism of the process of the invention and the basis for achieving improved results along the following lines.

First, it is assumed that a part of the thiocarbohydrazide formed according to equation (2) further reacts with unreacted hydrazinium-dithiocarbazinate according to equation (3) with the formation of hydrazine-dithiocarboxylic acid dihydrazide and hydrazinium sulfide,

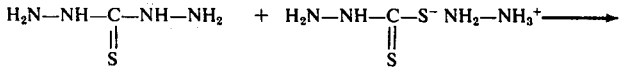

$$H_2N{-}NH{-}\underset{\underset{S}{\|}}{C}{-}NH{-}NH_2\ +\ H_2N{-}NH{-}\underset{\underset{S}{\|}}{C}{-}S^-\ NH_2{-}NH_3^+ \longrightarrow$$

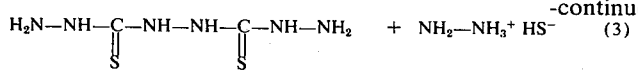
(3)

and the hydrazine-dithiocarboxylic acid dihydrazide cyclizes with a splitting off of hydrogen sulfide to form 3-hydrazino-4-amino-5-mercapto-1,2,4-triazole according to equation (4)

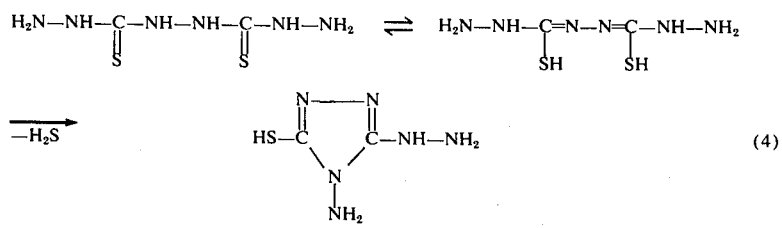

Since hydrazinium sulfide is present in H₂S-containing hydrazine hydrate, it follows that the formation of the hydrazine-dithiocarboxylic acid dihydrazide according to equation (3) is repressed, thereby also preventing the formation of the 3-hydrazino-4-amino-5-mercapto-1,2,4-triazole.

Hydrazinium-dithiocarbazinate can be produced in the conventional manner by reaction of carbon disulfide with hydrazine hydrate or with an aqueous hydrazine hydrate. It is possible to use a commercial grade of hydrazine hydrate, for example, one may even use an 80 to 85% product. Moreover, it is not necessary to use a completely pure hydrazine hydrate. It should be noted that the phrase "water-free hydrazine hydrate" is used herein to identify hydrazine combined with one molecule of water as represented by the formula:
  NH₂NH₂.H₂O
or
  N₂H₅OH.
Also, the phrase "aqueous hydrazine hydrate" refers to the fact that water has been added to the monohydrate.

In the reaction of hydrazinium-dithiocarbazinate according to the invention, one may use either the water-free or the aqueous hydrazine hydrate with good results. The water content of the hydrazine hydrate, however, should preferably not exceed 40% by weight, because above this limit the yield gradually decreases with an increasing water content. With an adequate concentration of hydrogen sulfide, one can still achieve yields of the thiocarbohydrazide of more than 90% of theory even where there is a water content of the hydrazine hydrate of up to 75% by weight. When using a water-free thiocarbohydrazide or an aqueous hydrazine hydrate with a water content of up to 35% by weight, almost quantitative yields can be achieved. For economical reasons, it is preferable to carry out the process of the invention with an aqueous hydrazine hydrate having a water content of up to about 40% by weight.

The thiocarbohydrazide yield is dependent to a much greater extent upon the content of the hydrogen sulfide in the hydrazine hydrate used as the reaction medium. If the hydrazinium-dithiocarbazinate is heated for four hours at 75°C., there is obtained a thiocarbohydrazide yield of about 70% of theory. By comparison, if an H₂S containing hydrazine hydrate is used according to the invention, it can be shown that the formation of the by-product 3-hydrazino-4-amino-5-mercapto-1,2,4-triazole is strongly repressed while the yield of thiocarbohydrazide increases with an increasing concentration of H₂S in the hydrazine hydrate reaction medium.

For example, when using an H₂S concentration in the range of 2 to 36% by weight, with reference to the total weight of the H₂S and the hydrazine hydrate, the formation of the triazole is decreased by at least 50%, i.e. using the minimum 2% H₂S. With an H₂S concentration of 5% by weight or more, the amount of triazole being formed is decreased by at least about 75%, and with a further increase of the H₂S concentration to more than 13% by weight, practically no triazole is formed. It is thus possible to obtain almost quantitative yields of thiocarbohydrazide if the H₂S concentration in the hydrazine hydrate reaction medium amounts to about 20 to 30% by weight. The yield then gradually decreases with the use of higher H₂S concentrations. For these reasons, the process of the invention preferably makes use of a hydrazine hydrate reaction medium with an H₂S content of about 20 to 30% by weight, with reference to the combined weight of the hydrogen sulfide and the hydrazine hydrate.

The hydrazine hydrate is used in the process of the invention in amounts of 0.1 to 3 mols, calculated as the water-free hydrazine hydrate, for each mol of hydrazinium-dithiocarbazinate. The use of a greater excess of hydrazine hydrate is of no particular advantage and is therefore avoided for economic reasons. It is desirable to use at least a sufficient amount of hydrazine hydrate to practically completely wet all of the hydrazinium-dithiocarbazinate crystals with the aqueous or water-free hydrazine hydrate. Thus, stoichiometric amounts of hydrazine hydrate are not necessary. Preferably, hydrazine hydrate is used in amounts of about 0.2 to 2 mols, calculated as water-free hydrazine hydrate, per mol of hydrazinium-dithiocarbazinate.

The conversion of the hydrazinium-dithiocarbazinate takes place most advantageously at a temperature between about 20°C. and 85°C. Reaction temperatures above 85°C. should ordinarily be avoided because under these conditions the reaction proceeds violently and uncontrollably and a very real danger of explosion of the reaction mixture exists. At temperatures of 20°C. and below, the formation of the thiocarbohydrazide does take place but the speed of reaction is relatively slow at these temperatures. The process of the invention is preferably carried out in a temperature range of about 50°C. – 80°C. If a short reaction period is to be achieved, the thermal treatment is best carried out at a temperature of about 72°C. to 78°C.

By maintaining the optimum conditions within the prescribed limits of the invention, the hydrazinium-dithiocarbazinate is practically quantitatively converted into thiocarbohydrazide.

In carrying out the process of the invention, the following procedure may be observed. The hydrazinium-dithiocarbazinate and the prescribed amount of 0.2 to 3 mols of hydrazine hydrate per mol of hydrazinium-dithiocarbazinate or an aqueous solution of the hydrazine hydrate in a corresponding concentration are admixed in the presence of the specified amount of hydrogen sulfide, and the mixture is then brought to the reaction temperatures. It is especially advantageous to proceed in the manner that the desired amount of hydrogen sulfide is first introduced into the hydrazine hydrate, followed by addition of the hydrazinium-dithiocarbazinate and finally heating to the reaction temperature. In this case, the resulting thiocarbohydrazide partly precipitates in solid form. It can be separated by complete distillation of the hydrazine hydrate. It is also possible, however, to filter off the thiocarbohydrazide, washing off any adherent hydrazine hydrate and then recycling the mother liquor which still contains dissolved hydrazinium-dithiocarbazinate and thiocarbohydrazide. The mother liquor can be circulated along as the water content does not rise above about 70- 75% by weight.

It is not absolutely necessary to proceed from the hydrazinium-dithiocarbazinate. According to a further embodiment of the process of the invention, one may use in place of the hydrazinium-dithiocabazinate a reaction mixture obtained by the reaction of carbon disulfide with excess hydrazinium-dithiocarbazinate with an addition thereto of hydrogen sulfide. Also, the process of using this initial reaction mixture is carried out under the same conditions as the decomposition of the hydrazinium-dithiocarbazinate. In making up the initial reaction mixture, it is preferably to introduce the carbon disulfide for reaction with a 2.1- to 5-fold molar amount of hydrazine hydrate at a temperature of approximately 0°C. The reaction mixture obtained in this manner is then reacted to about 20°C. to 85°C. after introducing the hydrogen sulfide. Under these conditions the desired excess of hydrazine hydrate is present in the decomposition of the hydrazinium-dithiocarbazinate. When working in this manner, the excess hydrazine hydrate is also recovered and can be returned in circulation.

In comparison to the known process for the production of thiocarbohydrazide from carbon disulfide and hydrazine, the process according to the invention has a number of advantages.

The thermal decomposition of hydrazinium-dithiocarbazinate in the absence of a solvent is disadvantageous insofar as it leads to a yield of only about 70% of theory of the thiocarabohydrazide. Besides, this known process is not suitable for a technical or industrial production of thiocarbohydrazide, because the thermal decompositon proceeds turbulently and can hardly be controlled.

The decomposition of hydrazinium-dithiocarbazinate in aqueous hydrazine according to the process of U.S. Pat. No. 2,276,263 takes place with an insufficient yield of only 57% of theory. If one proceeds from carbon disulfide and aqueous hydrazine and heats the reaction mixture containing hydrazinium-dithiocarbazinate under reflux, then the yield amounts to only 51% of theory. It is possible to obtain a reaction period in this known process which is only about one to two hours with the use of a reaction temperature of 95°C.

By comparison, the process of the invention requires about four to six hours at a reaction temperature of about 75°C. However, this minor disadvantage of a longer reaction period is more than compensated for by the lower temperature and especially the higher and almost quantitative yields of the present invention. The process of the invention, therefore, represents an especially economical process for the production of thiocarbohydrazide from carbon disulfide and hydrazine.

Thiocarbohydrazide is used in the large amounts for the industrial production of insecticides, fungicides and other agricultural chemicals.

EXAMPLES 1–14

100g. of reaction solution, which is composed of waterfree hydrazine hydrate and hydrogen sulfide, is heated with 100g. hydrazinium-dithiocarbazinate for a period of four hours at 75°C. Thereafter, the reaction solution is distilled off under vacuum and the crude thiocarbohydrazide obtained as a residue is recrystallized from the aqueous mother liquor of a previous run. The composition of the reaction medium, and the yields of thiocarbohydrazide and 3-amino-4-hydrazino-5-mercapto-1,2,4-triazole are set forth in the following Table 1:

TABLE 1

| Example No. | Composition of the Reaction Medium (% by wt.) | | Yields (% of theory) | |
|---|---|---|---|---|
| | $N_2H_5OH$ | $H_2S$ | Thiocarbo-hydrazide | Triazole |
| 1* | 100 | 0 | 58.2 | 40.0 |
| 2 | 98 | 2 | 78.6 | 17.0 |
| 3 | 95 | 5 | 87.3 | 8.3 |
| 4 | 90 | 10 | 92.1 | 4.9 |
| 5 | 85 | 15 | 94.1 | — |
| 6 | 83 | 17 | 95.2 | — |
| 7 | 81 | 19 | 95.8 | — |
| 8 | 79 | 21 | 96.5 | — |
| 9 | 77 | 23 | 98.2 | — |
| 10 | 75 | 25 | 97.5 | — |
| 11 | 73 | 27 | 96.3 | — |
| 12 | 71 | 29 | 94.5 | — |
| 13 | 67 | 33 | 92.3 | — |
| 14 | 64 | 36 | 91.0 | — |

*comparative example

As will be apparent from Table 1, the yield of thiocarbohydrazide clearly increases under the given conditions with an increase in concentration of hydrogen sulfide. A maximum yield is reached at about a 23% by weight concentration of $H_2S$ and then gradually drops off again with a further increase of the hydrogen sulfide concentration. In the absence of hydrogen sulfide according to comparative example 1, the triazole yield is 40% of theory while the yield of the desired thiocarbohydrazide is less than 60% of theory.

EXAMPLES 15–37

100g. of a reaction solution, which is composed of aqueous hydrazine hydrate and hydrogen sulfide, is heated with 100g. of hydrazinium-dithiocarbazinate for a period of four hours at 75°C. Thereafter the reaction solution is distilled off under vacuum, and the crude thiocarbohydrazide obtained as residue is recrystallized from aqueous mother liquor of a previous run. The composition of the reaction medium and the proportions of various components as well as the yield of thiocarbohydrazide are set forth in the following Table 2:

TABLE 2

| Ex. No. | Composition of the reaction medium (% by wt.) | | | mol ratio $N_2H_5OH:HCT$* | Partial concentrations of the reaction medium | | Thiocarbohydrazide Yield % of theory |
|---|---|---|---|---|---|---|---|
| | $N_2H_5OH$ | $H_2S$ | $H_2O$ | | $H_2S$ % by wt. with ref. to the water-free $N_2H_5OH$ | $H_2O$ % by wt. with ref. to the water-free $N_2H_5OH$ | |
| 15 | 72.40 | 24.60 | 2.90 | 2.12 | 25.33 | 3.85 | 96.2 |
| 16 | 68.80 | 23.42 | 7.78 | 2.01 | 25.39 | 10.16 | 96.0 |
| 17 | 65.18 | 22.19 | 12.60 | 1.90 | 25.39 | 16.20 | 97.5 |
| 18 | 61.56 | 21.00 | 17.40 | 1.79 | 25.43 | 22.04 | 99.2 |
| 19 | 57.94 | 19.72 | 22.30 | 1.69 | 25.39 | 27.80 | 96.2 |
| 20 | 54.32 | 18.50 | 27.18 | 1.58 | 25.40 | 33.35 | 97.2 |
| 21 | 63.05 | 25.81 | 11.12 | 1.84 | 29.05 | 15.00 | 95.5 |
| 22 | 61.37 | 25.14 | 13.47 | 1.79 | 29.06 | 18.00 | 95.3 |
| 23 | 59.66 | 24.47 | 15.86 | 1.74 | 29.08 | 21.00 | 95.3 |
| 24 | 57.92 | 23.78 | 18.29 | 1.69 | 29.10 | 24.00 | 95.5 |
| 25 | 56.24 | 22.25 | 20.80 | 1.64 | 28.34 | 27.60 | 95.5 |
| 26 | 54.34 | 22.36 | 23.89 | 1.59 | 29.10 | 30.54 | 96.6 |
| 27 | 44.86 | 18.43 | 36.70 | 1.31 | 29.11 | 45.00 | 96.0 |
| 28 | 34.36 | 14.08 | 51.54 | 1.00 | 29.06 | 59.93 | 95.2 |
| 29 | 22.64 | 9.42 | 67.93 | 0.66 | 29.38 | 75.50 | 91.5 |
| 30 | 9.59 | 4.03 | 86.37 | 0.28 | 29.59 | 90.00 | 75.4 |
| 31 | 50.0 | 28.6 | 21.4 | 1.46 | 36.39 | 30.00 | 92.6 |
| 32 | 44.5 | 25.7 | 29.7 | 1.30 | 36.60 | 40.00 | 94.0 |
| 33 | 39.1 | 21.9 | 39.0 | 1.14 | 35.90 | 50.00 | 93.4 |
| 34 | 32.4 | 19.0 | 48.6 | 0.95 | 36.96 | 60.00 | 94.2 |
| 35 | 25.6 | 14.5 | 59.8 | 0.75 | 36.16 | 70.00 | 94.7 |
| 36 | 18.0 | 9.9 | 72.1 | 0.53 | 35.48 | 80.00 | 86.3 |
| 37 | 9.4 | 6.2 | 84.4 | 0.27 | 39.74 | 90.00 | 77.0 |

*HCT = hydrazinium-dithiocarbazinate

Table 2 demonstrates that the very good yields are obtained when using the preferred concentrations of hydrogen sulfide and carbon disulfide. Moreover, it will be recognized that the thiocarbohydrazide yield gradually drops below 90% of theory with a water concentration above 75% by weight, taken with reference to the hydrazine hydrate.

EXAMPLES 38–41

Excess aqueous hydrazine hydrate is reacted with carbon disulfide while cooling, the temperature being maintained at 0°C. After completion of the reaction, the reaction mixture consisting essentially of hydrazinium-dithiocarbazinate, hydrazine hydrate and water is admixed with hydrogen sulfide while cooling and stirring and then heated for a period of four hours at 75°C. The remaining reaction medium is then distilled under vacuum and subsequently used for additional runs. The crude thiocarbohydrazide obtained as the residue is recrystallized from aqueous mother liquor obtained in previous runs. The data for these examples are collected in the following Table 3, including the yields of thiocarbohydrazide

EXAMPLE 42

100g. of an 80% aqueous hydrazine hydrate is admixed with 23g. hydrogen sulfide and then heated with 100g. hydrazinium-dithiocarbazinate for a period of four hours at 75°C. The reaction mixture is then cooled to 0°C. and the crystalline precipitate filtered off from the cooled mixture. The crystals are washed with a small amount of cold water and then dried. The yield of thiocarbohydrazide amounts to 69.7 grams, corresponding to 92.1% of theory.

The mother liquor (127g.) is admixed with 5.5g. hydrogen sulfide in order to maintain the ratio of hydrazine hydrate: hydrogen sulfide in the same proportion as the original reaction mixture. Then, the reaction mixture is again heated with 100g. hydrazinium-dithiocarbazinate for four hours at 75°C. Finally the reaction mixture is worked up in the same manner. The yield of thiocarbohydrazide amounts ot 73.2 grams, corresponding to 96.7% of theory, the product having a melting point of 169.5°C.

The invention is hereby claimed as follows:

1. In a process of the production of thiocarbohydrazide by the thermal treatment of hydrazinium-dithiocarbazinate in hydrazine hydrate as the reaction medium, the improvement which comprises carrying out said thermal treatment at a temperature of 20°C. to 85°C. in an aqueous or water-free hydrazine hydrate to which hydrogen sulfide has been added before said thermal treatment.

2. A process as claimed in claim 1 wherein the content of hydrogen sulfide in the reaction medium is about 2 to 36% by weight with reference to the combined weight of said hydrogen sulfide and the water-free hydrate.

TABLE 3

| Ex. No. | Starting product | | | | | | $H_2S$ | | Reaction medium Composition % by wt. | | | Mol ratio $N_2H_5OH$: $CS_2$ | Partial concentration of the reaction medium | | Yield Thiocarbohydrazide (% of theory) |
|---|---|---|---|---|---|---|---|---|---|---|---|---|---|---|---|
| | $CS_2$ | | $N_2H_5OH$ | | $H_2O$ | | | | | | | | $H_2S$ % by wt. with ref. to water-free $N_2H_5OH$ | $H_2O$ % by wt. with ref. to water-free $N_2H_5OH$ | |
| | g | mol | g | mol | g | mol | g | mol | $N_2H_5OH$ | $H_2S$ | $H_2O$ | | | | |
| 38 | 54.3 | 0.713 | 122 | 2.44 | — | — | 20 | 0.59 | 52.6 | 20.7 | 26.7 | 3.42 | 28.24 | 33.67 | 95.2 |
| 39 | 54.3 | 0.713 | 122 | 2.44 | — | — | 26 | 0.76 | 49.5 | 25.4 | 25.1 | 3.42 | 33.91 | 33.64 | 93.2 |
| 40 | 54.3 | 0.713 | 100 | 2.0 | 25 | 1.39 | 9.6 | 0.28 | 32.2 | 10.8 | 57.0 | 2.80 | 25.12 | 63.90 | 92.1 |
| 41 | 54.3 | 0.713 | 100 | 2.0 | 25 | 1.39 | 7.2 | 0.21 | 33.1 | 8.3 | 58.6 | 2.80 | 20.04 | 63.90 | 92.0 |

3. A process as claimed in claim 1 wherein the content of hydrogen sulfide in the reaction medium is about 13 to 30% by weight with reference to the combined weight of said hydrogen sulfide and the water-free hydrate.

4. A process as claimed in claim 1 wherein the hydrazine hydrate is used in an amount of 0.1 to 3 mols per mol of hydrazinium dithiocarbazinate.

5. A process as claimed in claim 1 wherein said thermal treatment is carried out at a temperature of about 50°C. to 80°C.

6. A process as claimed in claim 1 wherein said thermal treatment is carried out at a temperature of about 72°C. to 78°C.

7. A process as claimed in claim 1 in which said reaction medium is an aqueous hydrazine hydrate with a water content of up to about 40% by weight.

8. A process as claimed in claim 1 in which said reaction medium is water-free hydrazine hydrate.

* * * * *